Aug. 15, 1939.
A. F. HICKMAN
2,169,242
VEHICLE SPRING SUSPENSION
Original Filed Nov. 6, 1933
7 Sheets-Sheet 1
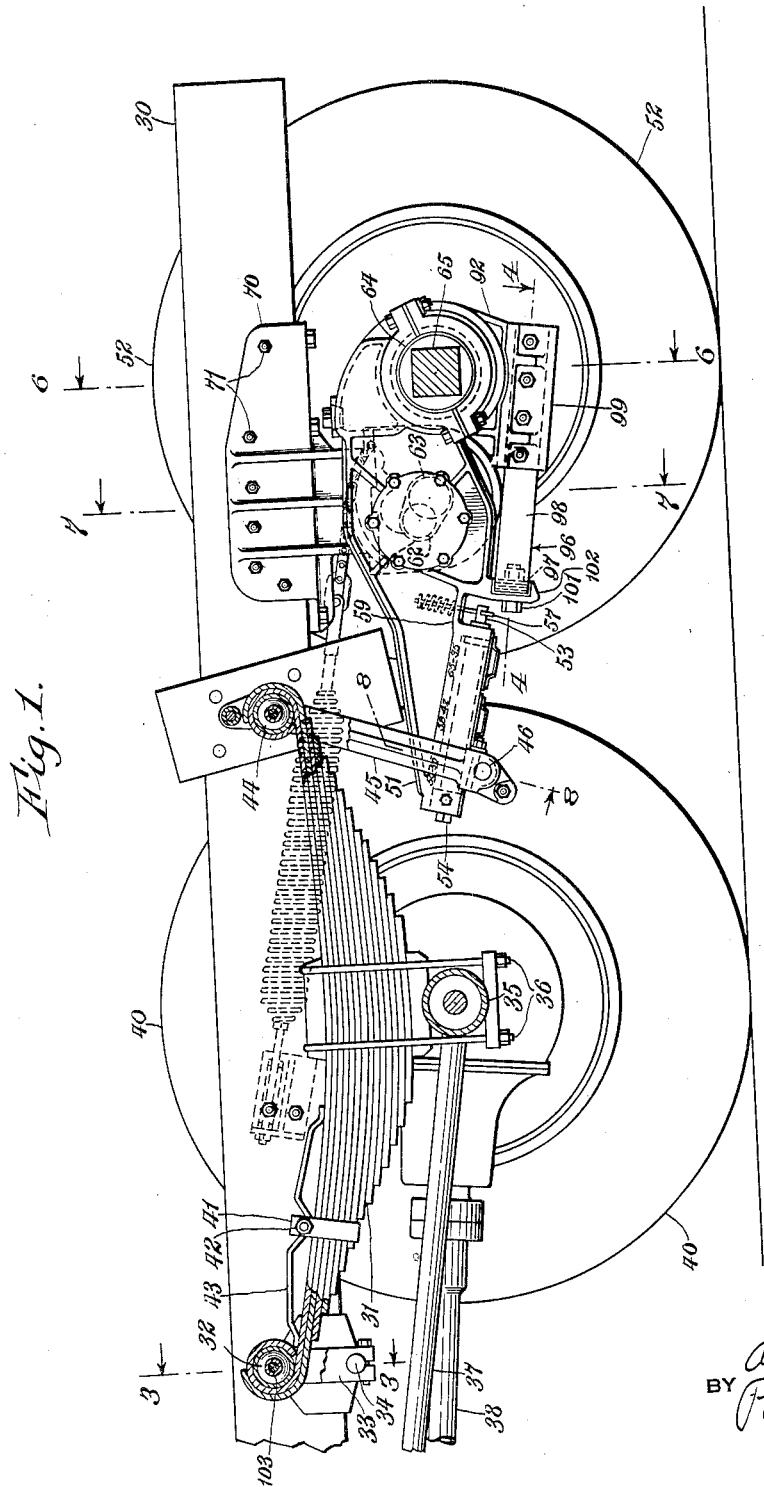
INVENTOR
Albert F. Hickman
BY Popp & Popp
ATTORNEYS

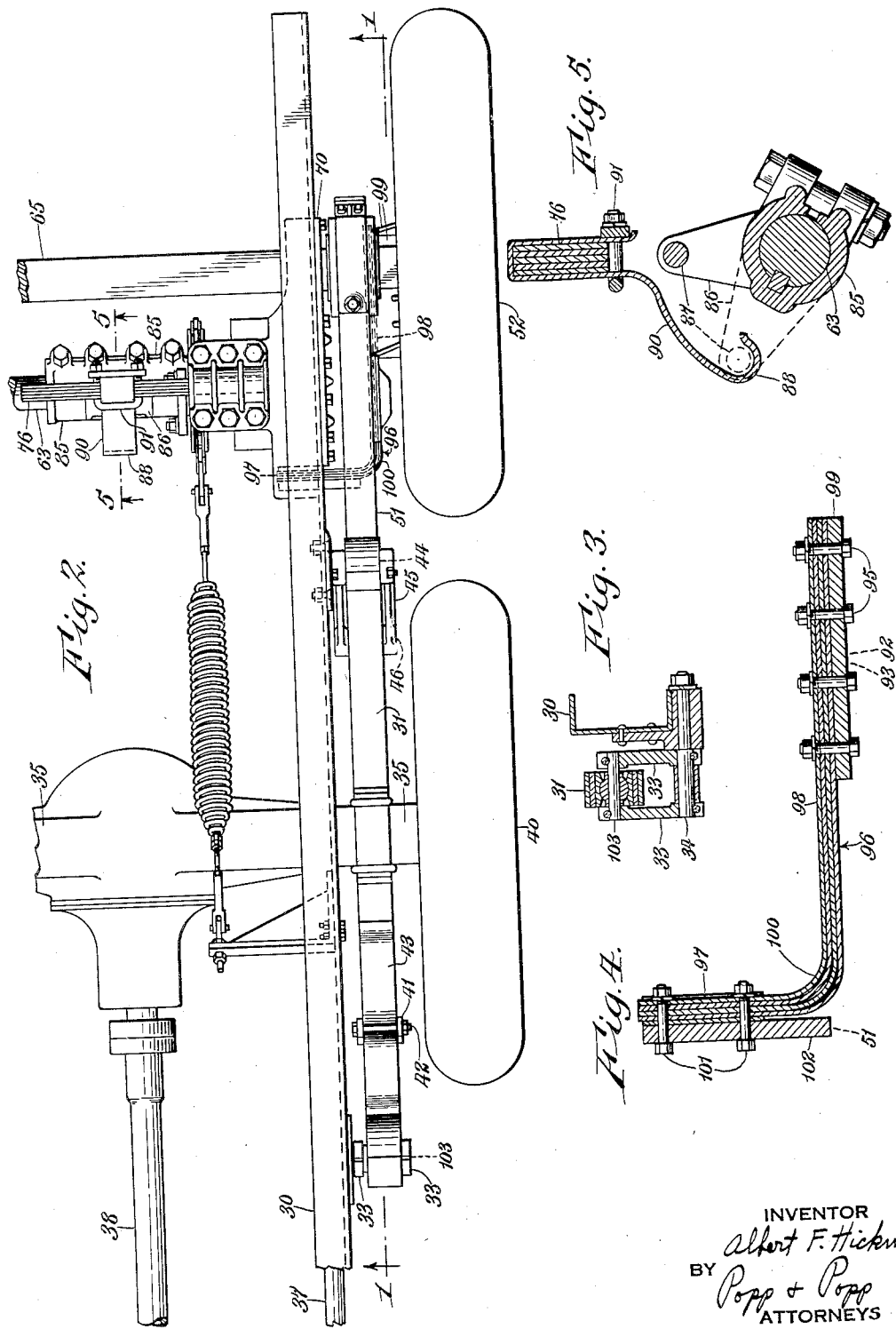

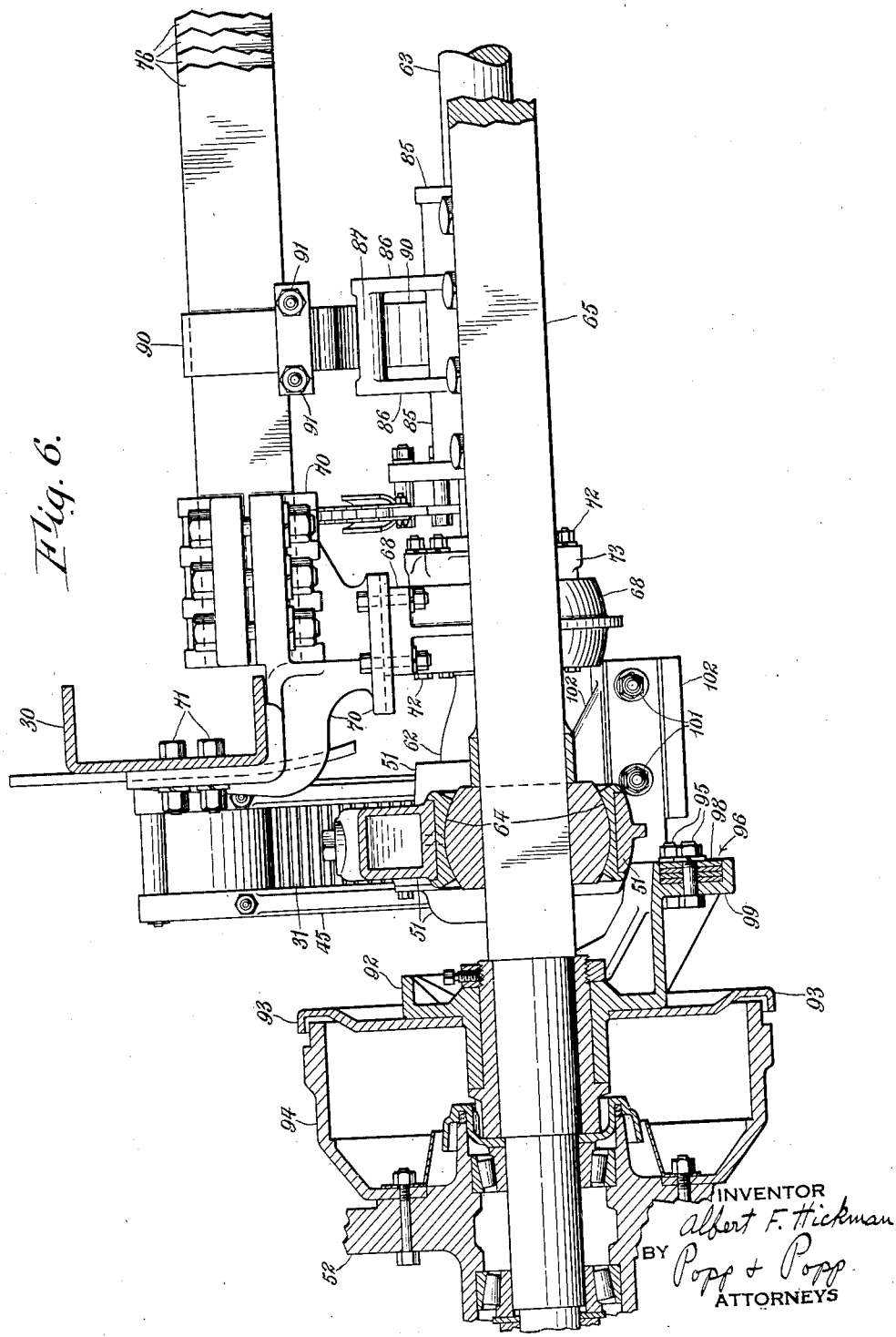

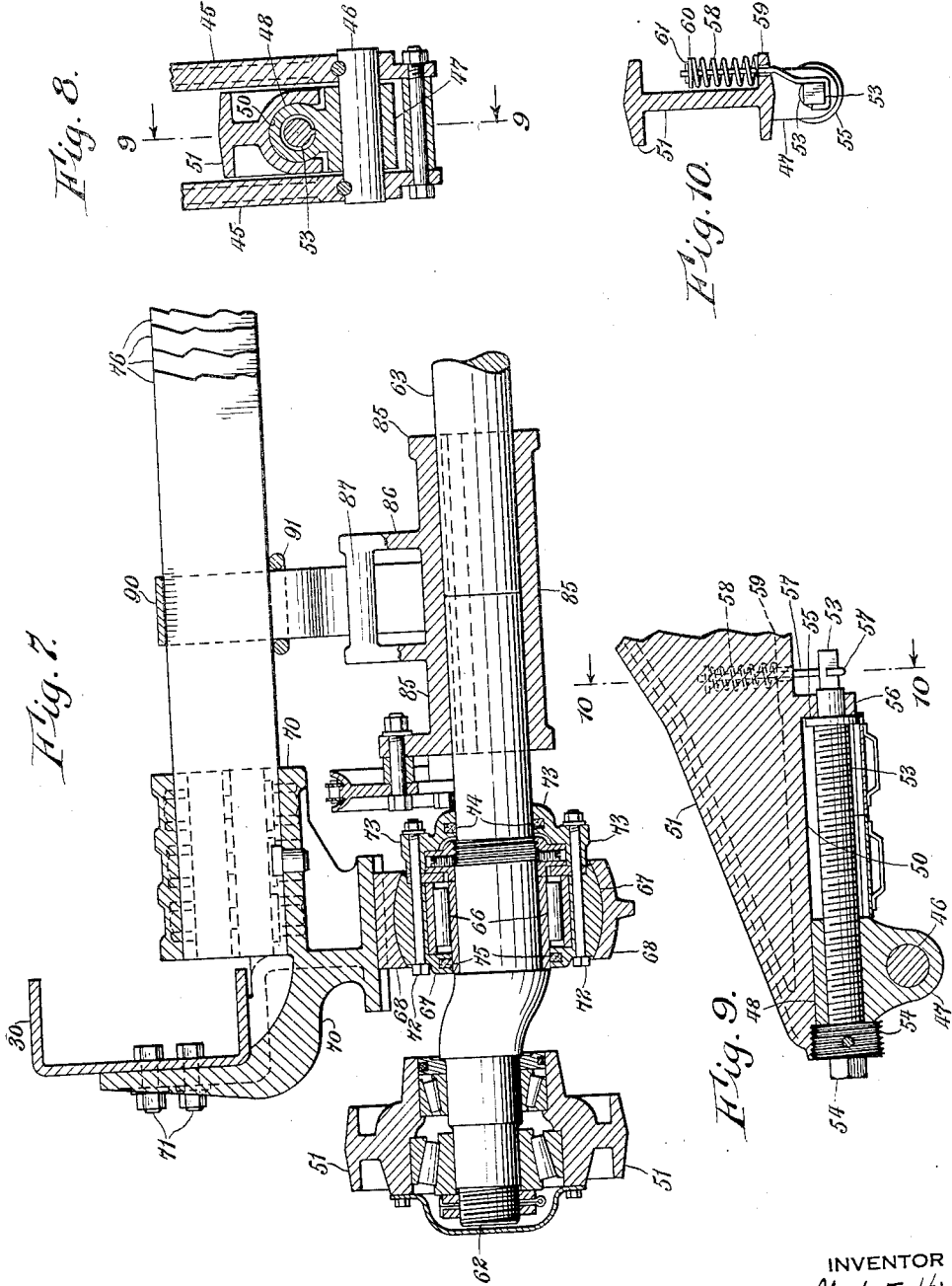

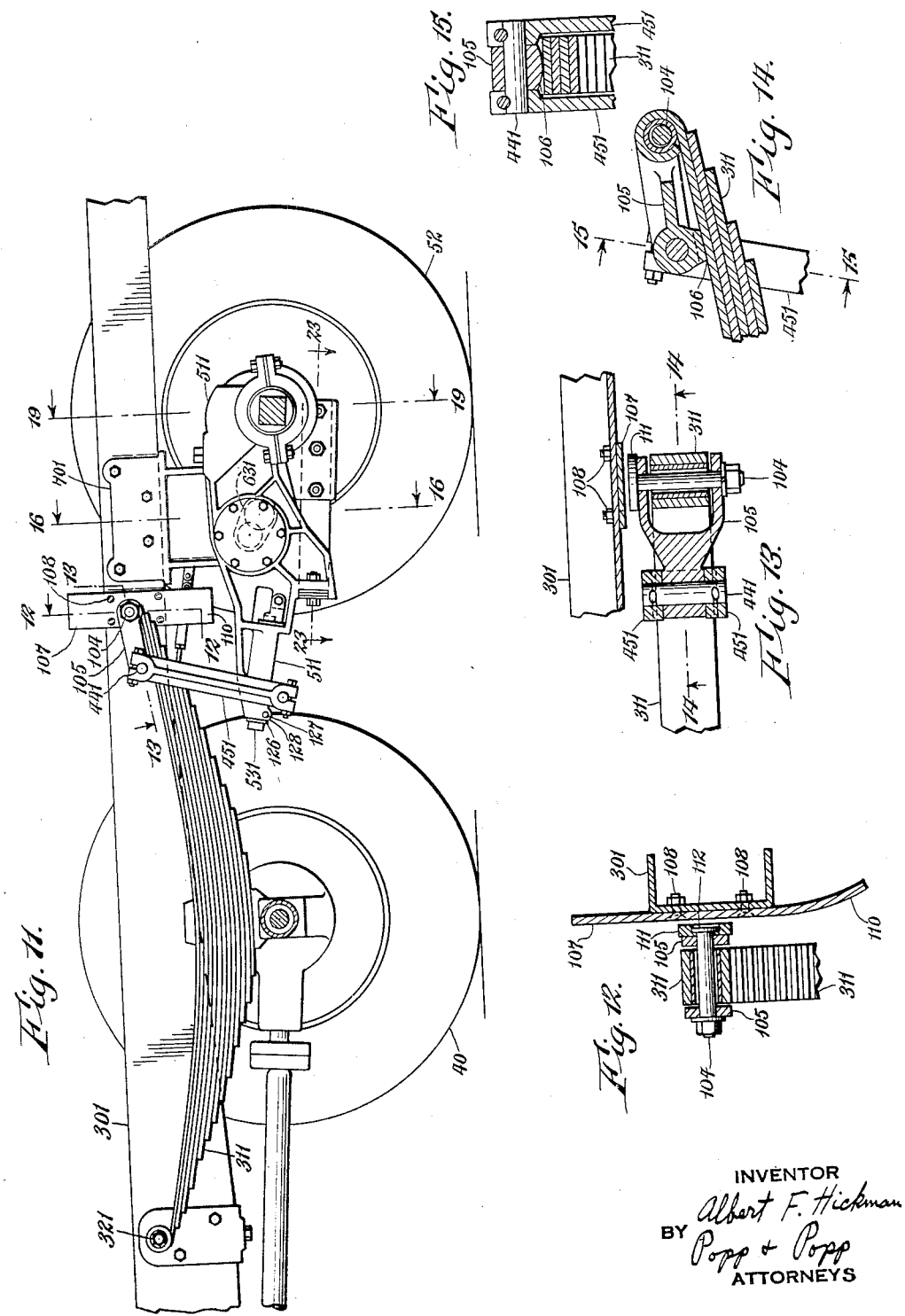

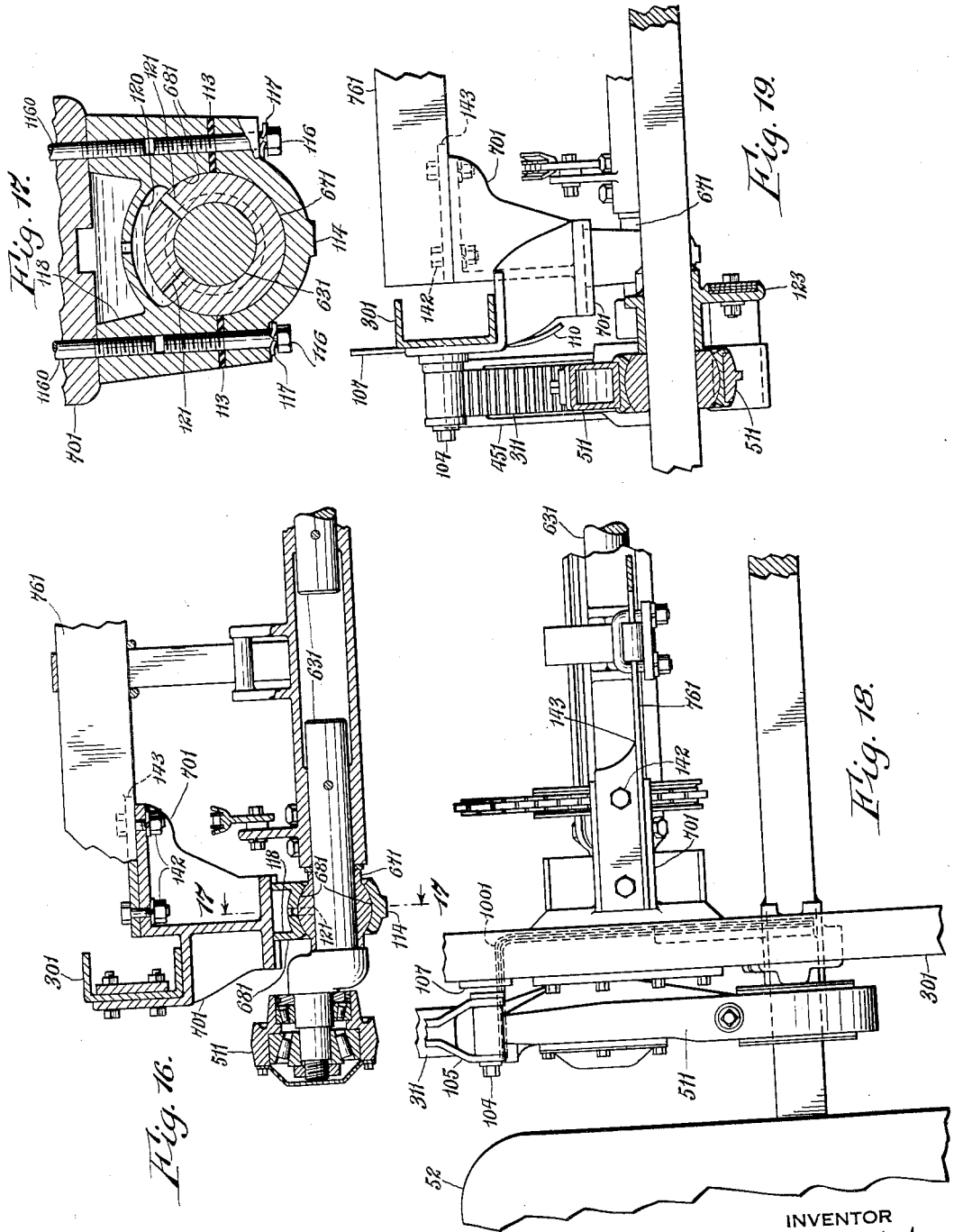

Aug. 15, 1939.
A. F. HICKMAN
2,169,242
VEHICLE SPRING SUSPENSION
Original Filed Nov. 6, 1933    7 Sheets-Sheet 7
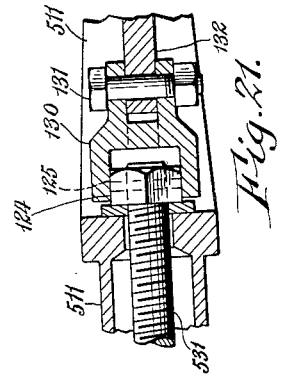
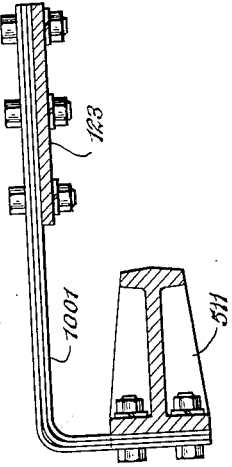
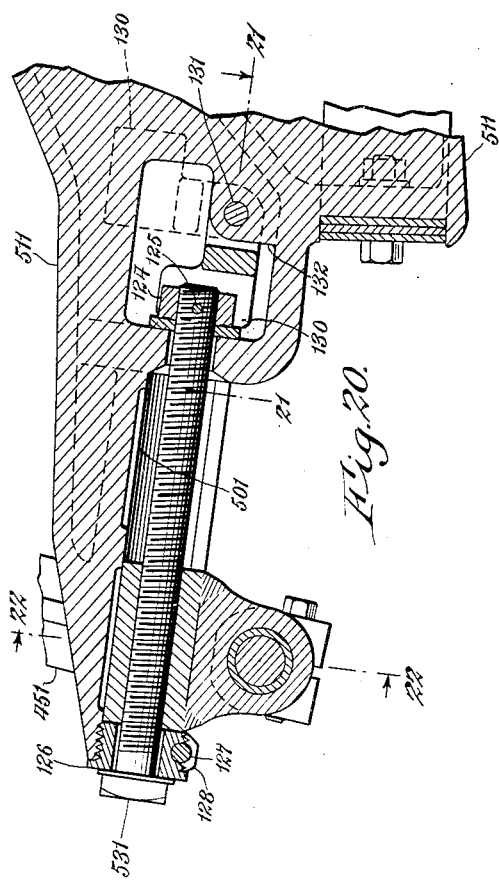
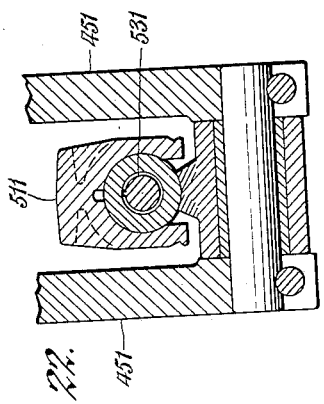
INVENTOR
Albert F. Hickman
BY Popp & Popp
ATTORNEYS Patented Aug. 15, 1939

2,169,242

UNITED STATES PATENT OFFICE 2,169,242

VEHICLE SPRING SUSPENSION

Albert F. Hickman, Eden, N. Y., assignor to Hickman Pneumatic Seat Co., Inc., Eden, N. Y., a corporation of New York Original application November 6, 1933, Serial No. 696,803. Divided and this application January 28, 1936, Serial No. 61,200

8 Claims. (Cl. 280—104)

This invention relates to a vehicle spring suspension for automobiles and the like, and more particularly to a three-axle (six wheel) vehicle spring suspension with a single drive axle and a single dead axle at the rear end of the vehicle and having the "non-bottoming" and "non-side sway" characteristics disclosed in my U. S. Patents Nos. 1,892,305, 1,934,670 and other U. S. patents and Canadian Patent No. 336,971.

The principal objects of the present invention are: to provide an improved means of absorbing the brake torque of the third axle wheels. To positively prevent locking of the operating parts at a past-dead-center position. To positively insure accurate alignment of the crank shaft roller bearings under all operating conditions. To prevent the traction adjustment from being accidentally altered after having been set in any certain desired position. To provide an improved means of distributing stress on the main springs as a consequence of the brake torque imposed thereon by the drive axle wheels. To absorb the periodic vibrations in the vehicle spring suspension. To prevent twisting strains from being imposed upon the main spring when the drive axle moves otherwise than in a direction parallel to the main chassis frame. To simplify the shackle connections between the main spring and the equalizer member. To prevent the spherical crank shaft bearings from being subjected to wear as a consequence of purely rotative forces, by preventing them from functioning except when the axis of the crank shaft shifts. To enable the spherical bearings to be oil and dust tight under all conditions. To reduce both the initial and the replacement cost of the particular parts which limit excessive side movement of the rear ends of the main springs.

Numerous other objects of the invention and practical solutions thereof are disclosed in the herein patent specification, wherein, in the accompanying drawings:

Heavy duty construction of Figs. 1-10

Fig. 1 is a diminutive vertical, longitudinal section through the rear end of a truck or similar vehicle equipped with my heavy duty form of improved spring suspension, taken on line 1—1, Fig. 2.

Fig. 2 is a diminutive, fragmentary top plan thereof.

Fig. 3 is a diminutive, fragmentary, vertical, transverse section, through the front end of the rear spring, taken on line 3—3, Fig. 1.

Fig. 4 is a substantially horizontal section through the resilient torque arm, taken on line 4—4, Fig. 1.

Fig. 5 is a vertical, longitudinal section, through the device for limiting the rotation of the crank shaft, taken on line 5—5, Fig. 2.

Figs. 6 and 7 are fragmentary, vertical, transverse sections, through the dead axle and crank shaft respectively, taken on correspondingly numbered lines of Fig. 1.

Fig. 8 is a fragmentary and substantially vertical section, through the lower end of the main shackle, taken on line 8—8, Fig. 1.

Fig. 9 is a fragmentary, vertical, longitudinal section, through the front end of the equalizer member, taken on line 9—9, Fig. 8.

Fig. 10 is a vertical, transverse section, through said equalizer member, taken on line 10—10, Fig. 9.

Light duty construction of Figs. 11-23

Fig. 11 is a diminutive, vertical, longitudinal section, through the rear end of a vehicle equipped with a light duty form of my improved vehicle suspension.

Fig. 12 is a fragmentary, vertical section thereof, taken on line 12—12, Fig. 11.

Fig. 13 is a fragmentary and substantially horizontal section, through the parts associated with the rear end of the main spring, taken on line 13—13, Fig. 11.

Fig. 14 is a fragmentary, vertical section, through the rear end of the main spring, taken on line 14—14, Fig. 13.

Fig. 15 is a fragmentary, vertical section thereof, taken on line 15—15, Fig. 14.

Fig. 16 is a diminutive, fragmentary, vertical section, through the crank shaft, taken on line 16—16, Fig. 11.

Fig. 17 is a fragmentary, vertical, longitudinal section, taken on line 17—17, Fig. 16.

Fig. 18 is a diminutive, fragmentary, top plan of the light duty form of construction.

Fig. 19 is a diminutive, fragmentary, vertical, transverse section thereof, taken on line 19—19, Fig. 11.

Fig. 20 is a fragmentary, vertical, longitudinal section of the front end of the equalizing member.

Fig. 21 is a fragmentary and substantially horizontal section thereof, taken on line 21—21, Fig. 20.

Fig. 22 is a fragmentary and substantially vertical section thereof, taken on line 22—22, Fig. 20.

Fig. 23 is a fragmentary and substantially horizontal section, through the torque arm, taken on line 23—23, Fig. 11.

Similar characters of reference indicate like parts in the several figures of the drawings.

This application is a division of my patent application for a "Vehicle spring suspension" filed November 6, 1933, Ser. No. 696,803 now Patent No. 2,087,255, issued July 20, 1937, and is a continuation-in-part of my Patent No. 1,934,670.

*Heavy vehicle type of construction, Figs. 1–10*

The main or chassis frame of the vehicle is principally constituted of a pair of chassis frame bars 30. These frame bars are transversely tied together by a plurality of cross members in the usual and well known manner, not deemed necessary here to be shown. Arranged parallel to and outside of said chassis frame bars 30 are a pair of main leaf springs 31, each of which is connected at its forward end by a ball and socket joint 32 to the upper end of a companion spring shackle 33. The latter in turn is pivoted at its lower end at 34 to its companion chassis frame bar 30. To the central parts of said main springs 31 is secured the usual transverse driving axle housing 35 by means of suitable clip bolts 36 or by any other suitable means. In this particular construction the thrust of said driving axle housing 35 is taken care of by a pair of suitable radius rods 37, while the power for rotating the drive shaft is supplied through a conventional drive shaft 38. Each end of the drive shaft 35 is provided with the usual drive wheels 40.

The front end only of each of these main springs 31 is supplied with a clip 41, the clip bolt 42 of which bears against the upper, central, dished face of a resilient straddle plate 43. This clip and straddle plate have two distinct functions, one of which is to distribute the force caused by driving-shaft brake torque to a considerable number of these spring leaves (this brake torque is counter-clockwise as viewed in Fig. 1). The other function of said clip and straddle plate is to impose a certain frictional resistance to spring flexure so as to rapidly damp out periodic vibrations in the spring structure as a whole.

Connected by a ball and socket joint 44 to the rear end of each main spring 31 is a main shackle 45. The lower end of each of these shackles is pivoted at 46 to the swivel head 47, shown in Figs. 8, 9 and 1. This swivel head is provided at its upper part with a longitudinal cylindrical portion 48 which is received within a semi-cylindrical bore 50 formed at the front lower portion of the equalizing member 51. This arrangement constitutes, in effect, a universal joint between the lower end of the main shackle 45 and the front end of the equalizing member 51.

For the purpose of adjusting the relative loads carried by and hence the proportion of traction between the driving wheels 40 and the third axle wheels 52 (hereinafter to be described), means are provided for adjustably and longitudinally moving the swivel head 47 relatively to the equalizing member 51. This adjustable movement of said swivel head 47 is effected in this heavy vehicle type of construction of Figs. 1–10 by a traction-adjusting screw 53, which is prevented from moving axially forward by reason of a screw plug 54 screwed into the front end of the semi-cylindrical bore 50 of the equalizing member 51. Axial rearward movement of said traction-adjusting screw 53 is prevented by a flange 55 formed integrally on said screw and bearing against the front face of a suitable lug 56 projecting downwardly and integrally from aforesaid equalizing member 51.

Adjustable rotation of said traction-adjusting screw 53 is rendered possible by having it of rectangular cross section at its rear end so as to enable it to be turned by a wrench. The threaded periphery of said adjusting screw engages with a suitable internal thread formed in the swivel head 47, so that, as said adjusting screw is turned in the one or other direction, said swivel head is caused to move longitudinally either forward or backward as may be desired.

One of the novel features in the present invention is the prevention of accidental rotation of this traction adjusting screw 53. In this heavy vehicle type of construction of Figs. 1–10, this result is effected by a locking dog 57, shown in Figs. 9, 10 and 1. The lower end of said locking dog is so bent or crooked and is of such rectangular configuration as to enable it to snugly embrace the rear squared end of the traction-adjusting screw 53. Said locking dog 57 is resiliently urged upwardly by a suitable compression spring 58 which rests upon the upper face of a laterally projecting flange 59 of the equalizing member 51 and is suitably connected at its upper end by means of a washer 60 and pin 61 with the upper end or shank of said locking dog. When the operator desires to rotate the traction-adjusting screw 53 so as to change the traction ratio between the driving and third axle wheels, he first pushes down said locking dog 57 against the resilient resistance of its compression spring 58 and then gives said locking dog a half turn so as to swing its lower end completely clear of the traction-adjusting screw 53. This permits the operator to conveniently apply a wrench to the rear end of said traction-adjusting screw without this operation being interfered with by said locking dog 57. With a suitable adjustment of said traction-adjusting screw 53 has been effected, the operator again pushes down said locking dog 57, gives the same a half turn, and then releases the tension he has been imposing upon the spring 58, thereby enabling said locking dog to resiliently return to the position shown in the drawings.

The central part of the equalizing member 51 is pivoted to the crank pin 62 of a crank shaft 63. The purpose of this crank shaft is described in detail in my Patents Nos. 1,892,305 and 1,934,670. The rear end of said equalizing member 51 is connected by a ball and socket joint 64 with a "dead" or third axle 65, the latter carrying, at its outer ends, the conventional third axle wheels 52.

The crank shaft 63 is journaled at its opposite ends by means of roller bearings 66 in a pair of spherical bearing heads 67. The periphery of each spherical bearing head is of spherical shape and is received within the spherical bore of a spherical bearing 68. This spherical bearing is suitably secured to the lower face of a bracket 70, which is suitably secured to the chassis frame bars 30 by suitable bolts 71 or otherwise. Thus it will be seen that the crank shaft 63 is free to rotate in the roller bearings 66 relatively to the spherical bearing head 67, and that the latter, together with its crank shaft 63, is free to oscillate in any direction with respect to the chassis frame bars 30.

It has been found highly desirable to maintain an accurate axial alignment between the crank shaft 63 and the spherical bearing heads 67 so as to avoid any crowding at the one or other end of either of the roller bearings 66. In the present invention this has been effected as follows:—

Secured by suitable bolts 72 or otherwise to the inner face of each spherical bearing head 67 is a centering collar 73 extending a considerable distance inwardly beyond said spherical bearing head and having a relatively close, running fit upon the periphery of the crank shaft 63. Thus, when said crank shaft is oscillated relatively to the spherical bearing 68, such a movement is immediately imparted through said centering collar 73 to the spherical bearing head 67, thereby maintaining the latter in positive axial alignment with the crank shaft 63 and insuring free action of the roller bearing 66 under any and all operating conditions. Leakage of oil toward the center of the vehicle from within the race of the roller bearing 66 is prevented by a suitable packing ring 74, while outward leakage from said roller bearing 66 is prevented by a similar packing ring 75. Both of the races of the roller bearing 66 are constituted, in the usual and well known manner, of sleeves and rollers of hardened and ground steel. No such provision, however, has been found necessary with respect to the spherical bearing 68, inasmuch as the total amount of movement of the spherical bearing head 67 relatively to said spherical bearing 68 is very small, such a movement only occurring when the chassis frame of the vehicle is distorted and to an extent proportional to the distortion.

It has been found, in actual practice, impracticable to entirely prevent the weaving and twisting of the channel frame bars of the ordinary vehicle having a rectangular frame supported at the four corners. The problem therefore has resolved itself in the present instance into permitting such frame weaving without either throwing the crank shaft bearings 66 out of alignment relatively to each other or allowing them to move toward and from each other. In the present invention this problem has been solved (for this heavy vehicle type of construction) by the adoption of a laminated cross bar 76, suitably connected at its opposite ends to the chassis frame bars 30. This laminated cross bar prevents said chassis frame bars 30 or their brackets 70 from moving relatively to each other in a vertical, transverse plane, but permits any other movement of said bars and brackets relatively to each other. This permits the chassis frame to weave without affecting the center-to-center distance between the spherical bearing heads.

Most trucks are subjected to terrific abuse by operators who are either indifferent or of low mentality. It has been found, because of this reason, that occasionally the crank shaft 63 will pass beyond its dead center position in a counter-clockwise directions (as seen in Fig. 5) due to the inertia and momentum forces involved. It has, accordingly, been found advisable to positively limit the rotation of said crank shaft in this direction and it has, furthermore, been found desirable to not suddenly stop the rotation of said crank shaft but to arrest its rotary movement by an increasing rate of resilient resistance, i. e. in a geometric manner. This result has been effected as follows:

Formed integrally on the clamping collar 85, which clamps the two sections of the crank shaft 63 together, are a pair of laterally extending stop arms 86 connected at their outer ends by a horizontal transverse stop pin 87. The stop pin 87 is adapted to engage with the crooked end 88 of a resilient stop finger 90. This stop finger has its inner end curled around the central part of the cross beam 76 so as to embrace the same and is suitably clamped thereto by a clamping bolt 91. The portion of said stop finger intermediate of said cross beams 76 and the crooked end 88 of said stop finger is not straight but is of arcuate or curved form. Thus, when the stop pin 87 rotates a sufficient distance in a counter-clockwise direction, as seen in Fig. 5, and comes into contact with the inner face of the crooked end 88, the further movement of said stop pin is not immediately arrested. This is because of the shape of said stop finger 90,—the curved intermediate portion thereof tending to straighten itself more and more as the pressure of the stop pin 87 is increased, until it finally becomes almost straight. Mathematically, it would require an infinite force to absolutely straighten said curved stop finger 90, and, consequently, the stopping of said stop pin may be said to be effected gradually and to never come to dead, sudden stop. This form of geometric resistance may, therefore, be denominated sinusoidal or "non-bottoming", similar to the action of the crank shafts described in detail in my U. S. Patents Nos. 1,892,305 and 1,934,670 and Canadian Patent No. 336,971.

The present invention provides an improved means of taking care of third-axle brake torque. Journaled upon each outer end of the third-axle is a torque sleeve 92 to which is suitably secured the usual backing plate 93. To this backing plate is secured, in the usual and well known manner, the brake shoes (not shown) which are adapted to be engaged with the bore of the brake drum 94 in the usual and well known manner. Hence, when the third-axle brakes are applied, a torque is imposed upon each backing plate 93. Secured by bolts 95, or otherwise, to a lower extension 99 of the torque sleeve 92 is a resilient, laminated, torque member 96. This torque member extends forwardly and substantially horizontally and at its front end curves inwardly in a smooth arc at 100 to form a straight, laterally extending, front, torque arm 97 which is disposed at right angles to the straight, rear torque arm 98. It will be noted, in Fig. 4, that at the point where the laminations of this torque member are bent at right angles to each other to form the smooth, curved portions 100, said curved portions are not in contact with each other, this being effected by a suitable variation in the radii of the laminations. Said front torque arm 97 is secured by bolts 101 or otherwise to a flange 102 depending integrally from the equalizing member 51. The action resulting from this construction is as follows:—

If one end only of the third-axle rises, the resilient, laminated, torque member 96 is caused to be twisted, and to this twisting offers only a relatively-slight, resilient resistance because of the fact that each of the laminations of which it is composed is relatively thin and the twisting to which it is subjected is substantially perpendicular of its rear arm 98. At the same time, however, any tendency of said backing plate 93 to rotate relatively to its companion equalizing member 51 is very strongly and stiffly resisted by reason of the fact that such a movement is in a vertical, longitudinal plane and hence parallel to the major axes of the laminations of the rear torque arm 98. It is to be particularly noted that said backing plate 93 can rotate on the third-axle, but only within the limits allowed by the resilient torque arm 96. Such a construction has been found necessary when (as in the construction of Figs. 1-10 under discussion) each of the ends of said third-axle is provided with a backing plate and a companion resilient torque arm. The reason for this journaled construction is that, when only the one end of the third-axle rises or falls relatively to the other end of said axle, the dead axle receives a torsional force relatively to said backing plate. With the construction here shown, neither of the backing plates move relatively to their equalizing members other than a short distance laterally, but both backing plates tend to rotate a considerable amount and are free to do so relatively to the adjacent portions of the third-axle. In addition to the foregoing, when one end only of the third-axle rises or falls, a longitudinal movement of the said one end of said third-axle relatively to its companion equalizing member occurs. This causes the rear torque arm 98 of the torque member 100 to be moved laterally a certain distance relatively to its front torque arm 97. It is to enable this swinging movement to be effected freely in either direction without undue strains on any of the laminations of the torque member 96 that is the reason for the laminations of said torque member being so formed as to be spaced apart from each other at the rounded corner 100.

It has become axiomatic that a spring suspension can only be entirely satisfactory if it permits one end only of an axle to rise or fall without causing any binding of any one of the various parts. This axiom of the spring suspension applies not only to the brake torque, as just described, but to a number of the other parts of the spring suspension. For instance, when the drive axle 35 moves either up or down at its one end only, the front end of the main spring 31 tends to move inwardly toward the chassis frame. To prevent binding, it has been found desirable to permit of such inward movement, the same being accomplished in the present invention in the manner illustrated in Fig. 3. This shows that, when said drive axle 35 is parallel to the main chassis frame, the front end of the main spring 31 is in contact with the outer member of the shackle 33, but is spaced an appreciable distance outwardly from the outer face of the inner member of said shackle 33. Excessive lateral movement of any kind is, of course, to be avoided and hence when the drive axle is in its normal position it is preferable, as shown, to definitely locate said axle transversely of the vehicle by this contact between the outer face of said main spring 31 and the outer member of said shackle 33. At the same time, however, if only one end of the axle rises or falls, the main spring 31 is free to slide inwardly on the pivot pin 103.

Light construction of Figs. 11-23

In this form of the invention the essential characteristics of the previously described construction are employed but in a much more simple fashion so as to render the same commercially adaptable to lighter weight trucks. In this case a Hotchkiss drive is disclosed, the front end of the main spring 311 being directly pivoted to chassis frame bar 301 by a plain pivot 321. Such a construction, of course, eliminates the need of the radius rod 37 of Fig. 1.

This construction also discloses the means whereby the ordinary rear main springs of the original two-axle truck are employed, when the same is converted into a three-axle truck, by merely shortening the effective length of the regular main springs 311 so as to eliminate the necessity of entirely replacing the same by main springs especially constructed for the three-axle spring suspension. Extending longitudinally forward from the standard rear pivot 104 is a spacing link 105. The pivotal connection between the rear end of the spacing link 105 and the main spring 311 is preferably very loose, as shown in Figs. 14, 15, 16, so as to allow the front end of said spacing link to rock (and incidentally also twist) a small amount to the one or other side of the central position shown in the drawings. The front end of this spacing link 105 is pivoted at 441 to the upper end of a main shackle 451. The pressure imposed by said shackle 451 upon the main spring 311 is downward under practically all operating conditions. This downward thrust is carried by the front end of the spacing link 105, the lower face of said front end being suitably rounded at 106, as shown in Figs. 15 and 14, to freely permit the rocking action just described. This rounded construction permits of a non-friction or rolling action, enabling the lower end of the shackle 451 to swing laterally in one or other direction to a moderate but sufficient extent. This construction renders the connection between the shackle 451 and the main spring 311 substantially equivalent to the ball and socket joint 44 of Fig. 1, without requiring that a special main spring be constructed to obtain this ball-and-socket joint effect.

It has been found very desirable to permit of a moderate lateral movement of the rear ends of the main springs 31, 311, but at the same time to positively limit this lateral movement. This positive limitation is effected by a guide plate 107 which is secured to its companion chassis frame bar 301 by countersunk bolts 108 or the like, and suitably curved inwardly at its lower end at 110 so as to absolutely insure that the rear end of the main spring will not become jammed against the lower edge of said guide plate 107. Heretofore, the pivot pin 104 has been so constructed as to have its head in direct contact with said guide plate 107. This, however, involves an unnecessarily high replacement cost when the head only of the pivot pin becomes unduly worn, especially if said pivot pin be constructed of sufficiently high carbon steel to enable its head to be tempered. The present construction eliminates this difficulty by providing a hardened and ground button 111 (see Fig. 12) which takes all of the wear involved in the lateral movement of the rear ends of the main springs. This button is suitably counterbored and rabbeted to receive the small annular head 112 of the pivot bolt 104. When this button becomes unduly worn after prolonged service of the vehicle, it may be inexpensively replaced without requiring replacement of the pivot bolt 104.

In this form of the invention (Figs. 11-23) the roller bearings 66 of Fig. 7 have been eliminated and an ordinary straight bearing substituted. Such a straight bearing is, of course, liable to seize and to thereby cause more or less of the entire rotary movement of the crank shaft 631 to be transmitted to the spherical bearing 681. Such a possibility is eliminated in the present invention (see Figs. 17 and 16) by providing a heavy frictional resistance between the spherical bearing head 671 and its spherical bearing 681, thereby permitting this spherical bearing to come into play only when the axis of the crank shaft moves in some plane which intersects its normal axis. In other words, this heavy friction on the spherical bearing 681 causes the cylindrical pivotal connection between the crank shaft 631 and the spherical bearing head 671 to take care of all the ordinary (rotative) movements of the crank shaft 631, and to permit the spherical bearing head 671 to only move in its spherical bearing 681 when the axis of the crank shaft changes. This effect is accomplished by interposing a resilient gasket 113 between the spherical bearing cap 114 and the spherical bearing 681 and clamping said cap and bearing together by a suitable pair of cap screws 116 interposed between each of which and said spherical bearing cap 114 is a resilient washer 117 constructed of a conventional lock washer. This resilient washer is not used primarily as a lock washer but has the specific function of resiliently urging the spherical bearing cap 114 toward the spherical bearing 681 and compressing the resilient gasket 113 therebetween. It should be added, however, that this resilient washer 117 does prevent loosening of its companion cap screw 116 and hence incidentally acts as a lock washer as well as a solely resilient washer. The resilient gasket 113 is constructed of rubber or like material, its primary function being to permit the lock washers 117 to at all times resiliently urge the spherical bearing cap 114 downwardly against the resilient washers 117, but it also serves to prevent any oil leakage from the spherical bearing and to exclude dirt therefrom. This spherical bearing receives its lubricant from a suitable reservoir 118 formed in the spherical bearing 681, the oil being fed to an arcuate groove 120 formed in the bore of said spherical bearing 681. The plain cylindrical bearing between the crank shaft 631 and the spherical bearing head 671 is also lubricated from this same source, said spherical bearing head 671 being radially drilled at two places at 121 so as to enable lubricating oil to flow from the arcuate groove 120 therethrough and to said plain cylindrical bearing, even though the spherical bearing head 671 should become displaced rotatably a considerable distance in the one or other direction from the position shown in the drawings. It is to be noted that, while the spherical bearing cap 114 is at all times resiliently urged toward the spherical bearing 681, the connection between said bearing 681 and its companion bracket 701 is absolutely rigid due to the cap screws 1160. By reason of this resilient connection between the spherical bearing 681 and its cap 114, it has been found unnecessary to grind or to otherwise accurately machine the spherical surfaces of either the spherical bearing head 671 or its companion spherical bearing 681 and cap 114. Actual experience has demonstrated that such a spherical bearing laps itself perfectly during the first thousand miles of vehicle travel. In other words, the truck laps in its spherical bearings after all the parts are assembled and as a consequence of actual service, thereby not only effecting a lapping action which is so extremely accurate as to be fluid tight, but also eliminating the otherwise high cost of accurately machining the spherical bearing parts.

In relatively light vehicles, such as one and one-half ton trucks (Figs. 11-23) it has been found entirely feasible to eliminate the third-axle brake torque sleeves 92 of Fig. 6 and to secure the third-axle backing plates directly to the third-axle, employing, preferably, only the one L shaped resilient torque arm 1001. In this case the front arm of said resilient torque arm is secured, as before, to the equalizing member 511, while the rear arm of said resilient torque arm is secured to a sleeve 123 welded or otherwise rigidly secured to the third-axle. Such a construction has been found entirely practical and very inexpensive to manufacture, but it is not deemed suitable for very heavy vehicles.

Figs. 20, 21 and 22 illustrate a modified means of effecting traction adjustment and of preventing accidental change of adjustment after the same has been made. In this case the adjusting screw 531 is constructed of a plain standard bolt and is prevented from moving longitudinally relatively to the equalizing member 511 by reason of its head at its one end and its nut 124 at its other end, the latter being prevented from turning by a suitable pin 125. Rotation of said traction-adjusting screw 531 is effected by applying a wrench to its head which is located at its front end. To enable the parts to be assembled, the bore 501 extends clear to the front end of the equalizing member 511 and a threaded bushing 126 is screwed into the forward end of said assembled bore 501. After said threaded bushing 126 has been screwed firmly into place, it is clamped by a clamping bolt 127 which compresses together the two clamping ears 128 which are suitably formed at the extreme front end of the equalizing member 511.

This light duty vehicle construction also includes a modified means of preventing accidental rotation of the traction-adjusting screw 531. This is effected by a bifurcated locking dog 130 which is horizontally and transversely pivoted at 131 to a suitable, vertical, longitudinal projection or ear 132 formed integrally on the equalizing member 511. When it is desired to turn the traction-adjusting screw 531, this bifurcated locking dog 130 is pushed up and back into the dotted line position of Fig. 20, and said traction-adjusting screw then rotated to the desired position. Thereupon, said bifurcated locking dog 130 is returned to the full line position of Figs. 11, 20 and 21 in which position it embraces the flat, side faces of the square nut 124 of said traction-adjusting screw.

In this light duty vehicle construction, a modified form of cross beam 761 has been found satisfactory and very inexpensive. In this case said cross beam is constructed of ordinary angle iron secured at its opposite ends by bolts 142 to the brackets 701. The horizontal flange of said angle iron cross beam 761 extends, however, only a short distance inwardly of each bracket 701, being cut away at 143. Thus, the entire central portion of the cross beam 761 intermediate of the bracket 701 consists solely of a bar of metal of rectangular section having its major axis vertical and of considerable size, while its minor axis is disposed horizontally and longitudinally of the vehicle and is relatively small. Thus said cross beam 761 is capable of being quite easily twisted or bent in a horizontal plane but vigorously resists any stress tending to bend it in a plane which is vertical and transverse of the vehicle.

I claim as my invention:

1. A vehicle suspension comprising: a chassis frame; an equalizing member; means movably connecting said equalizing member with said frame; an axle provided with a wheel and movably connected with said equalizing member; a backing plate mounted on said axle; and a resilient torque arm connected at opposite ends respectively with said backing plate and said equalizing member and capable of resisting rotation of said backing plate relatively to said equalizing member, but resiliently permitting all other movements of said backing plate relatively to said equalizing member.

2. A vehicle suspension comprising: a chassis frame; an equalizing member; means movably connecting said equalizing member with said frame; an axle provided with a wheel and movably connected with said equalizing member; a backing plate mounted on said axle; and a resilient torque member constituted of a pair of arms arranged perpendicularly of each other and disposed in a substantially horizontal plane; means connecting the one arm of said torque member with said equalizing member; and means connecting the other arm of said torque member with said backing plate.

3. A vehicle suspension comprising: a chassis frame; an equalizing member; means movably connecting said equalizing member with said frame; an axle provided with a wheel and movably connected with said equalizing member; a backing plate mounted on said axle; and a vertically laminated torque member of L shape, the laminations of which are separated from each other at the corner of the L; means connecting the one arm of said L shaped torque member with said equalizing member; and means connecting the other arm of said L shaped torque member with said backing plate.

4. A vehicle suspension comprising: a chassis frame; an equalizing member; means movably connecting said equalizing member with said frame; an axle provided with a wheel and movably connected with said equalizing member; a torque sleeve journaled on said axle and provided with a backing plate; and a resilient torque arm connected at opposite ends respectively with said torque sleeve and said equalizing member.

5. A vehicle suspension comprising: a chassis frame; a bearing; means connecting said bearing with said frame; a crank shaft journaled in said bearing and having a crank pin; an axle provided with a wheel; means connecting said axle with said crank pin; and means for initially, resiliently restraining rotation of said crank shaft and thereafter positively limiting the extent of said rotation.

6. A vehicle suspension comprising: a chassis frame; a spherical bearing connected with said frame; a crank shaft having a crank pin; a spherical bearing head arranged in said spherical bearing and having its central part journaled on said crank shaft and having a longitudinally-extending guiding sleeve embracing said crank shaft; a wheel having an axle; and means connecting said axle with said crank pin.

7. A vehicle suspension comprising: a chassis frame; a member; means movably connecting said member with said frame; a spindle provided with a wheel and movably connected with said member; a resilient torque arm and means connecting said resilient torque arm at its opposite ends, respectively, with said member and with said spindle, and capable of resisting rotation of said spindle relatively to said member, but resiliently permitting all other movements of said spindle relatively to said member.

8. A vehicle suspension comprising: a chassis frame; a pair of members; means movably connecting each member with said frame; an axle provided with wheels and movably connected at its opposite ends with said members; a resilient torque arm and means connecting said resilient torque arm at its opposite ends, respectively, with one of said members and with said axle, and capable of resisting rotation of said axle relatively to said member, but resiliently permitting all other movements of said axle relatively to said member.

ALBERT F. HICKMAN.